A. T. SAWYER.

CLAMP FOR BEDS.

APPLICATION FILED JULY 16, 1908.

Reissued Mar. 9, 1909. 12,926.

Witnesses:

[illegible]

Norris Sumby

Inventor

Almont T. Sawyer

By

James L. Norris

Atty.

THE NORRIS PETERS CO., WASHINGTON, D. C.

UNITED STATES PATENT OFFICE.

ALMONT T. SAWYER, OF NASHUA, NEW HAMPSHIRE, ASSIGNOR OF ONE-FOURTH TO CLAIR MUNSON, OF CLINTON, IOWA.

CLAMP FOR BEDS.

No. 12,926. Specification of Reissued Letters Patent. Reissued March 9, 1909.

Original No. 826,363, dated July 17, 1906, Serial No. 301,163. Application for reissue filed July 16, 1908. Serial No. 443,937.

*To all whom it may concern:*

Be it known that I, ALMONT T. SAWYER, a citizen of the United States, residing at Nashua, in the county of Hillsboro and State of New Hampshire, have invented a new and useful Clamp for Beds; and I do hereby declare the following to be a full, clear, and exact description of the invention, such as will enable others skilled in the art to which it appertains to make and use the same.

The invention relates to clamps for rigidly holding connecting-blocks for beds in position while they are being exhibited in show-windows and the like and which will prevent the blocks from accidentally releasing the beds.

With these and other objects in view the invention consists in the construction and novel arrangement of parts hereinafter described and shown, and particularly pointed out in the appended claims.

Figure 1:
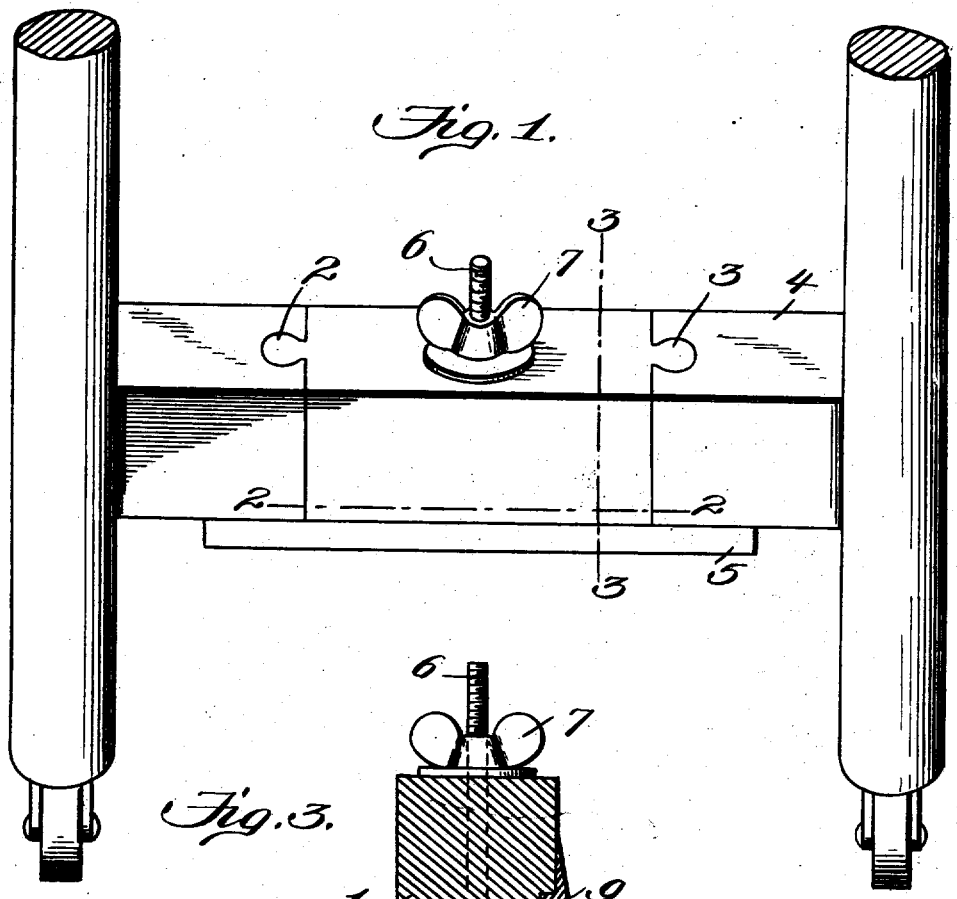
Figure 3:
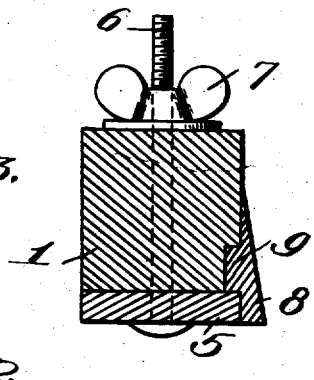
Figure 2:
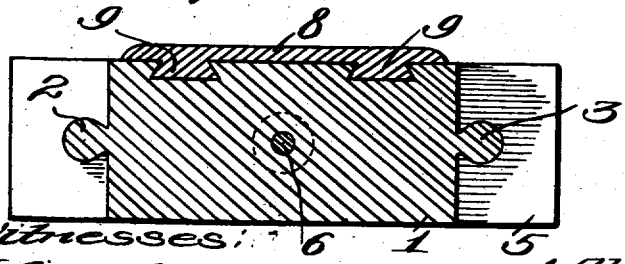
Figure 4:
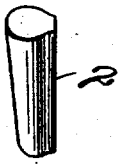

In the drawings forming part of this specification, and in which like numerals of reference designate corresponding parts: Figure 1 is a perspective view of the clamp constructed in accordance with this invention. Fig. 2 is a longitudinal sectional view taken on the line 2 2 of Fig. 1. Fig. 3 is a transverse sectional view taken on the line 3 3 of Fig. 1. Fig. 4 is a perspective view of the tapered dovetailed projection.

Referring to the drawings, 1 designates a block having dovetailed projections 2 and 3, which are adapted to engage recesses of like configuration in the horizontal bars 4 of an ordinary iron bed.

The projections 2 and 3 are tapered downwardly, and the block 1 is provided with a plate 5, which is clamped to the bottom thereof by a threaded bolt 6, having a nut 7, and which is slightly longer than the block 1, by which it is adapted to engage the bottom of the horizontal bars 4, by which the block 1 is held against vertical movement.

In order to prevent the plate 5 from rotating, which would release the block, I provide a plate 8, which is arranged at right angles with the plate 5, as shown in Figs. 2 and 3 of the drawings. The plate 8 is provided with a pair of vertically-disposed dovetailed tongues 9, which engage dovetailed grooves on one side of the block 1. In operation the block 1 is put in position, then the plate 8, and last the plate 5 is placed at the bottom, and the bolt and nut hold them rigidly in position. Should the nut become loose, as is likely in the course of time, which would permit the plate 5 to accidentally rotate, the plate 8 is adapted to hold it against such action.

The tongues 9 rest on the plate 5; by which it is prevented from dropping down. The tongues 9 only extend about one-third of the way to the top of the block 1.

What I claim is:

1. A device of the class described, comprising a block having dovetailed projections tapered downwardly, and engaging dovetailed recesses in the horizontal bars of a bed, said block having a plate engaging the bottom thereof, and extending beyond each end thereof and engaging the ends of said bars and a plate adapted to hold said first-named plate against rotation.

2. A block connecting the horizontal bars of a bed, a plate arranged beneath the same and adapted to hold the said block against vertical movement, and a plate adapted to hold said plate against rotation.

3. A clamp for connecting the horizontal bars of a bed comprising a block, having dovetailed projections, engaging dovetailed recesses in said horizontal bars, a plate secured to the bottom of said block and extending beyond each end thereof, a second plate arranged at an angle to said first-named plate and engaging the same, and having vertically-disposed dovetailed projections, engaging dovetailed recesses in said block, substantially as described.

4. A clamp for display beds comprising, in combination with the end bars of bed frames, said end bars having vertical recesses extending from a horizontal face thereof, a coupling member having integral end portions formed for articulate engagement in said recesses and movable vertically into or out of engagement in said recesses through the plane of corresponding horizontal faces of said end bars at one side thereof, a plate lying adjacent to a horizontal face of said member and having end portions projecting over the other horizontal faces of said end bars, means for removably assembling said plate upon said member, and independent means for holding said plate against movement out of line with said end bars.

5. A clamp for display beds, comprising, in combination with the end bars of bed frames, said end bars having downwardly tapered recesses opening at the front and top faces thereof, a coupling member having end portions formed for interfitting engagement in said recesses, means removably associated with said member and engaging the under faces of said end bars to hold said member against upward displacement, and means associated with the member for holding said last named means against displacement from its active position.

6. A clamp for display beds, comprising in combination with the end bars of bed frames, said end bars having downwardly tapered recesses opening at the front and top faces thereof, a rigid coupling block having downwardly tapered integral conical projections at the ends thereof for wedge-like interfitting engagement in said recesses, said block in assembled relation resting by gravity between said end bars, an integral plate lying adjacent to the under face of said block and having projecting end portions engaging the under faces of both of said end bars to prevent upward displacement of said block, and means for securing said plate to said block for removal therefrom.

7. A clamp for display beds, comprising, in combination with the end bars of bed frames, said end bars having downwardly tapered recesses opening at the front and top faces thereof, a coupling member having downwardly tapered conical projections at the ends thereof for interfitting engagement in said recesses, a plate lying adjacent to the under face of said member and having projecting end portions engaging the under faces of said end bars to prevent upward displacement of said member, a bolt connecting said plate to said member for removal therefrom and a second plate secured to said member at one side thereof and having a depending portion engaging the side of said first named plate to hold the latter from turning on said bolt.

8. A clamp for display beds comprising in combination with the end bars of bed frames, said end bars having recesses formed therein, a coupling member having end projections to engage in said recesses, a plate having articulate assemblage upon one side of said coupling member, said plate having a depending portion, and a second plate lying adjacent to the under face of said coupling member and projecting under said end bars and under portions of said first plate into engagement with the depending portion of the latter, and means for assembling said second plate upon said coupling member for removal therefrom.

9. A clamp for display beds comprising, in combination with the end bars of bed frames, a coupling member having engagement with said end bars, a plate carried pivotally by said coupling member and having portions thereof projecting under said end bars, and means displaceably associated with said coupling member at one side thereof and engaging said plate to hold the latter against movement on its pivot.

10. In a device of the type set forth, in combination with the end bars of bed frames, a coupling member having end projections for articulate engagement with said end bars, a plate for holding said coupling member against displacement from its active position, said plate engaging said end bars, means for assembling said plate pivotally upon said coupling member, and means displaceably associated with the latter for holding the plate against pivotal movement.

11. A clamp for display beds, comprising, in combination with the end bars of bed frames, a coupling member having end portions formed for articulate engagement with said end bars, means pivotally assembled upon said member for holding the latter against axial displacement, and means displaceably mounted upon said member for holding the pivotally assembled means against pivotal displacement.

12. In a bed clamp, in combination, a short rail coupling block constructed to seat itself interlockingly and by gravity, a locking member pivotally assembled on said block and having an operative position to hold the block seated, and an inoperative position to allow of the block being removed, and means associated with one of said elements and cooperating with the companion element for locking the member against displacement from its operative position.

13. In a short rail clamp for display beds, in combination with the end bars of bed frames, a coupling block having wedge-like engagement in said end bars, a locking plate to positively hold the block against displacement and engaging said end bars, means for pivotally assembling the plate upon the block and positive means for holding the plate against pivotal displacement from the operative position thereof.

In testimony whereof I have hereto affixed my signature in the presence of two witnesses.

ALMONT T. SAWYER.

Witnesses:
C. L. Barnard,
E. B. Gould.